United States Patent [19]

Saito

[11] 4,408,316

[45] Oct. 4, 1983

[54] ROTARY RECORDING MEDIUM REPRODUCING APPARATUS HAVING A JACKET OPENING ENLARGING DEVICE

[75] Inventor: Takashi Saito, Ayase, Japan

[73] Assignee: Victor Company of Japan, Ltd., Yokohama, Japan

[21] Appl. No.: 293,835

[22] Filed: Aug. 18, 1981

[30] Foreign Application Priority Data

Aug. 18, 1980 [JP] Japan ............................ 55-116721[U]

[51] Int. Cl.$^3$ ............................................. G11B 1/00
[52] U.S. Cl. .................................... 369/77.2; 369/292
[58] Field of Search ................. 369/77, 219, 243, 249, 369/262, 263, 270, 291, 292

[56] References Cited

U.S. PATENT DOCUMENTS 3,873,100 3/1975 Omiya et al. .......................... 369/77
4,168,835 9/1979 Omiya et al. ......................... 369/262

FOREIGN PATENT DOCUMENTS 2488717 2/1982 France ................................ 369/270

Primary Examiner—Steven L. Stephan
Attorney, Agent, or Firm—Louis Bernat

[57] ABSTRACT

A reproducing apparatus for a rotary recording medium accommodated within a jacket. The apparatus comprises a jacket opening enlarging mechanism which enables the jacket to move above a turntable positioned between an inserting opening through which the jacket is inserted and a rear part of the apparatus. The jacket opening enlarging mechanism comprises upper and lower enlarging members which are aligned horizontally with the inserting opening, when the jacket opening enlarging mechanism is in the vicinity, for receiving the inserted case. The upper and lower enlarging members are pivotally coupled to each other, with their front edges mutually open toward the inserting opening and their rear edges mutually closed. The respective rear edges of the upper and lower enlarging members open and mutually separate from each other as the jacket opening enlarging mechanism moves toward the rear part of the reproducing apparatus responsive to the insertion of the case.

7 Claims, 6 Drawing Figures

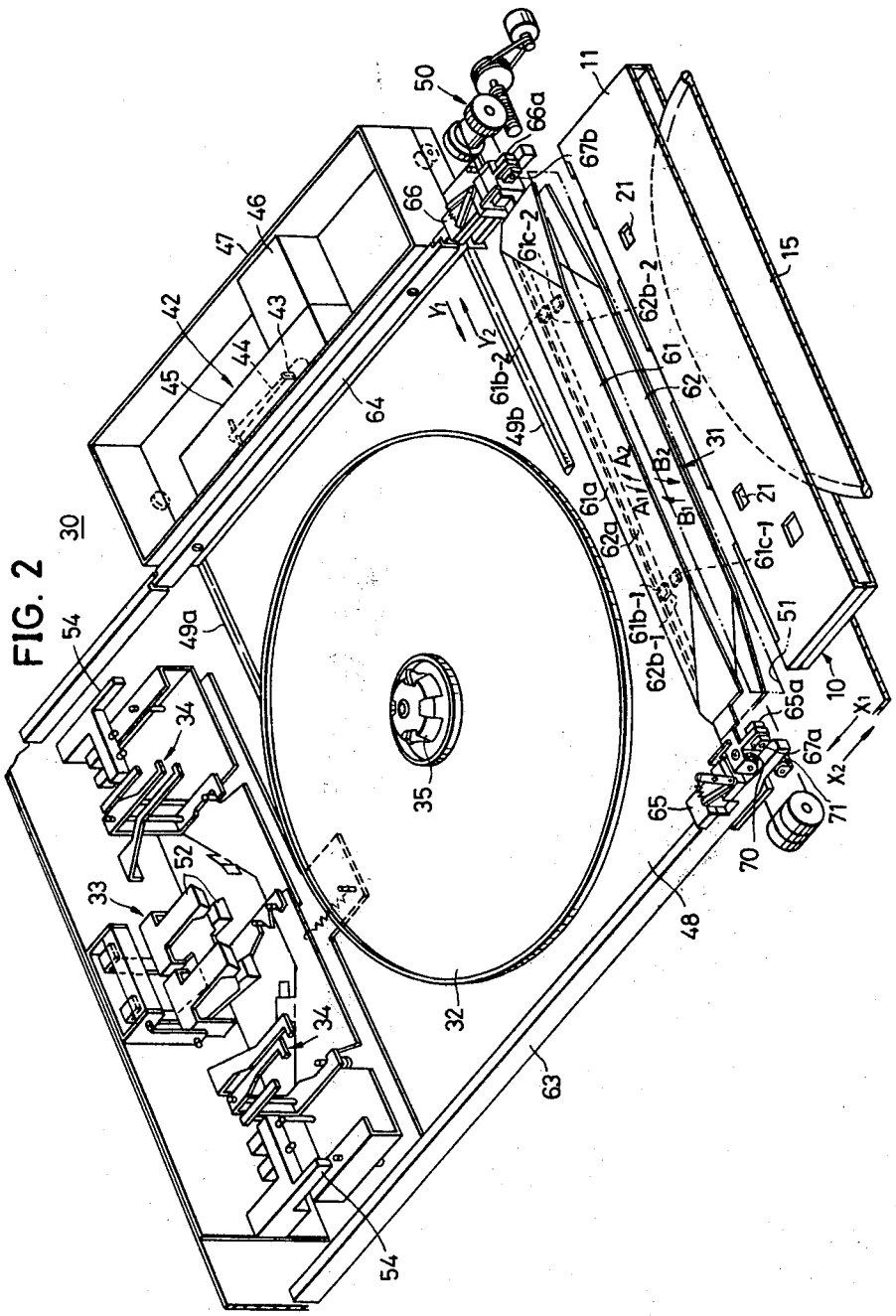

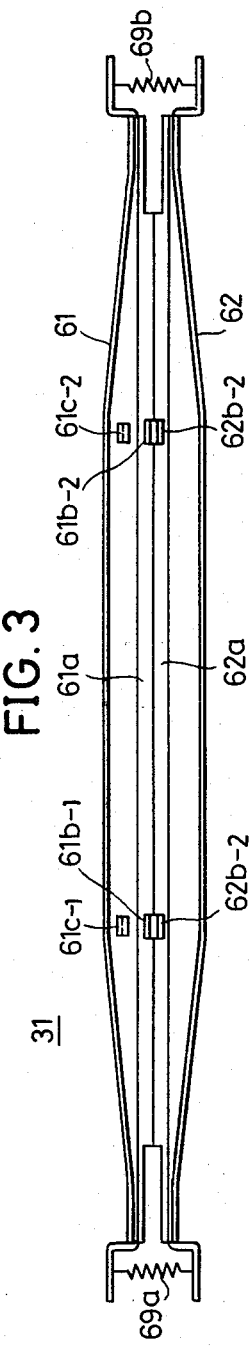
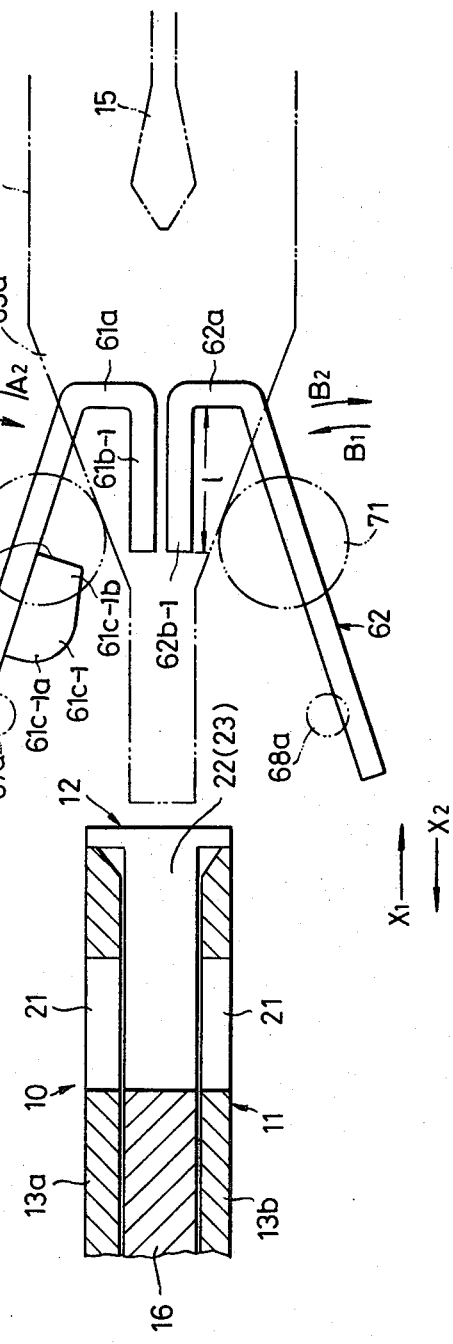

ROTARY RECORDING MEDIUM REPRODUCING APPARATUS HAVING A JACKET OPENING ENLARGING DEVICE

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention relates more particularly to a rotary recording medium reproducing apparatus having a jacket opening enlarging device for enlarging an opening of the jacket, when the jacket is inserted into the reproducing apparatus.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc jacket (disc case) which has a lid and accommodates a disc therein, from within the reproducing apparatus. As a conventional apparatus of this type, in a U.S. patent application Ser. No. 231,868 filed Feb. 5, 1981, entitled "DISC-SHAPED RECORDING MEDIUM REPRODUCING APPARATUS" in which the assignee is the same as that of the present application, a reproducing apparatus was proposed which cooperates with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, jacket opening enlarging device provided in the vicinity of the inserting oepning, capable of moving over the turntable between the position in the vicinity of said inserting opening and the innermost part of said reproducing apparatus, for enlarging the opening of the jacket by entering inside said cutouts of said lid member, upon insertion of the jacket into the reproducing apparatus through the inserting opening, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In this reproducing apparatus, the jacket opening enlarging device comprises the upper and lower arms extending toward the disc case inserting opening so as to converge as they approach the disc inserting opening, which are adapted to rotate, when the jacket is inserted into the reproducing apparatus, so as to separate from each other and enlarge the opening of the jacket. The above arms are provided on an upper and lower beams extending in the transverse direction of the reproducing apparatus. These beams do not serve as a door for normally closing the disc inserting opening, which means that a door for the inserting opening is required, thus making the construction of the reproducing apparatus complex by that much. Further, since the arms extend so as to allow the tip ends thereof to enter into the windows in jacket halves of the jacket inserted through the inserting opening, the free ends of the arms are inevitably located in the vicinity of the inserting opening. Accordingly, in such a case of wiping off the dust inside the inserting opening, the operator may be scratched on the finger by the tip ends of the arms. Therefore, the reproducing apparatus has been accompanied by problems in that some danger is encountered in the maintenance operation.

SUMMARY OF THE INVENTION

Accordingly, a general object of the present invention is to provide a novel and useful rotary recording medium reproducing apparatus in which the above described problems have been eliminated.

Another and more specific object of the present invention is to provide a rotary recording medium reproducing apparatus which is provided with a jacket opening enlarging device which is adapted to additionally serve as a door for closing the inserting opening and further to ensure safely maintenance around the inserting opening.

Further objects and features of the present invention will be apparent from the following detailed description when read in conjunction with the accompanying drawings.

BRIEF DESCRIPTION OF THE DRAWINGS

FIG. 2 is a perspective view showing the inner construction of a rotary recording medium reproducing apparatus according to the present invention, with a part cut away;

FIG. 3 is an elevation showing an embodiment of a jacket opening enlarging device which forms an essential part of the reproducing apparatus according to the present invention; and FIGS. 4A, 4B and 4C are cross-sectional diagrams respectively showing how the jacket opening enlarging device operates to enlarge the opening of the jacket, when the case is inserted into the reproducing apparatus.

DETAILED DESCRIPTION

Figure 1:
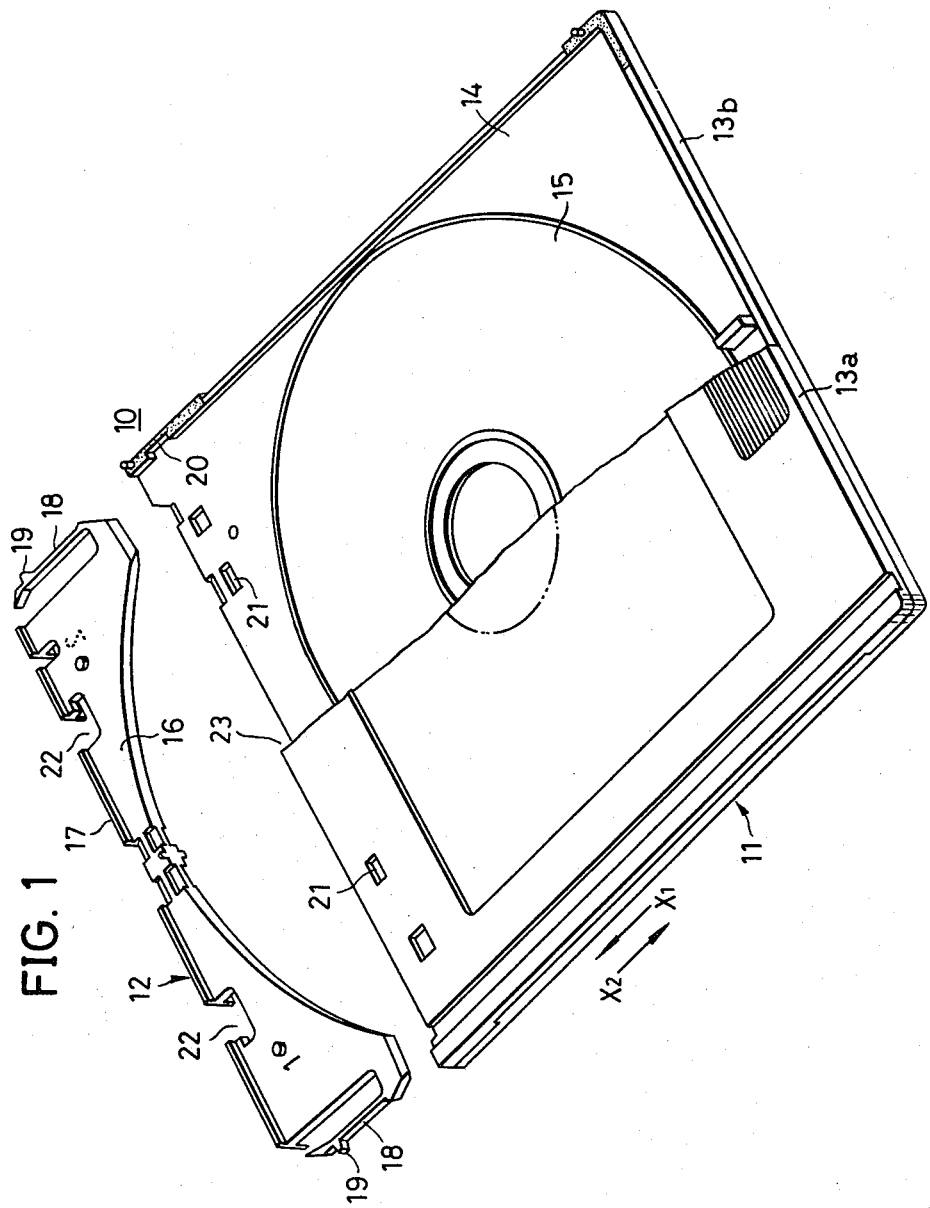
FIG. 1 is a perspective view showing an example of a disc case which operates together with a rotary recording medium reproducing apparatus according to the present invention, with a part cut away and disassembled.

In FIG. 1, a disc case 10 comprises a jacket 11 and a lid plate 12. The jacket 11 is assembled from a pair of jacket halves 13 and 13, and comprises a flat cavity or space 14 therein. This space 14 is open at an opening 23 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

As shown in FIG. 2, a reproducing apparatus 30 substantially comprises a jacket opening enlarging device 31 which constitutes an essential part of the present invention, a turntable 32 to rotate the disc 15 positioned thereon, a disc holding mechanism 33 for clamping the disc 15, a lid plate locking mechanism 34 for locking the lid plate 12, and the like. The construction and operation of the jacket opening enlarging device 31 will be described further below.

A reproducing transducer 42 comprises a pickup device 45 including a cantilever 44 provided with a reproducing stylus 43 a resonator 46 and the like, and is mounted to a carriage 47. The carriage 47 is transferred in the directions of the arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of an inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of the arrow X1.

When the disc case 10 is inserted into the reproducing apparatus 30 in the above described state, the jacket opening enlarging device 31 is pushed and moved in the direction of the arrow X1 by the disc case 10. As the enlarging device 31 moves, the front part of the upper and lower jacket halves 13 are enlarged upwards and downwards, to enlarge the opening 23, as will be described further below.

When the disc case 10 is inserted into the innermost part of the reproducing apparatus 30 together with the enlarging device 31 through the upper side of the turntable 32, cutouts 22 of the lid plate 12 is locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. In a state where the jacket 11 is completely pulled out from the reproducing apparatus 30, the disc 15 is supported horizontally at a position directly above the turntable 32.

Then a play operation is performed. Responsive to this operation, the disc 15 is lowered and placed onto the turntable 32, and is clamped by a disc clamping mechanism 35 which will be described hereinafter. In addition, the disc 15 is rotated towards a clockwise direction shown by an arrow A together with the turntable 32.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the disc 15 is pushed upwards. The disc 15 which is pushed up is held by the disc holding mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, an embodiment of a jacket opening enlarging device constituting an essential part of reproducing apparatus of the present invention will be described with reference to FIGS. 3, 4A, 4B, and 4C. In these figures, those constituent parts which are the same as corresponding parts shown in FIGS. 1 and 2 are designated by like reference numerals and will not be described again in detail.

The jacket opening enlarging device 31 is constituted, essentially, by elongated upper and lower enlarging members 61 and 62 extending in the arrow directions Y1 and Y2 and sliders 65 and 66 fitted on guide rails 63 and 64 and supporting the opposite ends of the enlarging members 61 and 62. In accordance with the insertion and extraction of the disc case 10, this jacket opening enlarging device 31 moves in the arrow directions X1 and X2 under the guidance of the guide rails 63 and 64, passing between a position in the vicinity of the inserting opening 51 and the innermost part of the reproducing apparatus 30 and above the turntable 32.

The upper enlarging member 61 is rotatably supported to pivot in the arrow directions A1 and A2, trunnions 67a and 67b at its left and right ends being respectively journaled in bearing parts 65a and 66a on the upper sides of the sliders 65 and 66. The lower enlarging finger 62 is also rotatably supported in a similar manner to pivot in the arrow directions B1 and B2, its trunnions 68a and 68b (one not shown) being journaled in the bearings (not shown) on the lower side of the sliders 65 and 66. The trunnions 67a, 67b, 68a, and 68b are respectively disposed in the enlarging members 61 and 62 at the lateral edges in the arrow direction X2. Tension coil springs 69a and 69b are stretched between the ends of the upper and lower enlarging members 61 and 62 to urge them toward their closing directions indicated by arrows A1 and B1.

Furthermore, in the upper enlarging member 61, a downwardly bent part 61a is formed at the edge opposite that of the trunnions 67a and 67b. Two enlarging fingers 61b-1 and 61b-2 are formed by bending at two positions of this downwardly bent part 61a. These enlarging fingers 61b extend toward the inserting opening 51 (arrow direction X2) at positions confronting the two cutouts 22 of the lid plate 12 of the inserted disc case 10. Similarly, the lower enlarging member 62 is also formed to have a bent part 62a and enlarging fingers 62b-1 and 62b-2. The two sets of enlarging fingers 61a-1, 62b-1 and 61a-2, 61b-2 confronting in the upward and downward directions mutually cooperate to carry out a case enlarging operation as described hereinafter. Further, the upper enlarging member 61 is formed to have lugs 61c-1 and 61c-2 to be inserted into the windows 21 of the upper jacket half 13a of the enlarged jacket 11. The lower enlarging member 62 has no lugs.

In addition, the upper and lower enlarging members 61 and 62 are provided with rollers 70 and 71 (left-hand rollers not shown) for rolling on the guide rails 63 and 64 to cause the enlarging members to separate in the upward and downward directions.

When the jacket opening enlarging device 31 is positioned on the side of the inserting opening 51 as shown in FIG. 2, the rollers 70 and 71 are at the narrow parts of the tapered parts 63a on the front sides of the guide rails 63(64). At this time, the upper enlarging member 61 has been rotated in the arrow direction A1 by the force of the tension coil springs 69a and is in a downwardly declining state. The lower enlarging member 62 at this time has been rotated in the arrow direction B1 and is in an upwardly inclining state. For this reason, the bent parts 61a and 62a at the free edges of the upper and lower enlarging members 61 and 62 are in pressing contact, thereby closing the inserting opening 51 as will be understood from FIGS. 2, 3, and 4A. Thus, the upper and lower enlarging members 61 and 62 have the function of closing the inserring opening 51, whereby a gate exclusively for closing this inserting opening becomes unnecessary. For this reason, the construction of the inserting opening part becomes simple.

In the above described state, moreover, the enlarging fingers 61b-1, 61b-2, 61b-1 and 62b-2 are in mutually close positions which are at the height position of the center of the case inserting opening 51.

The jacket opening enlarging device 31 of the above described construction operates as follows.

Figure 4B:
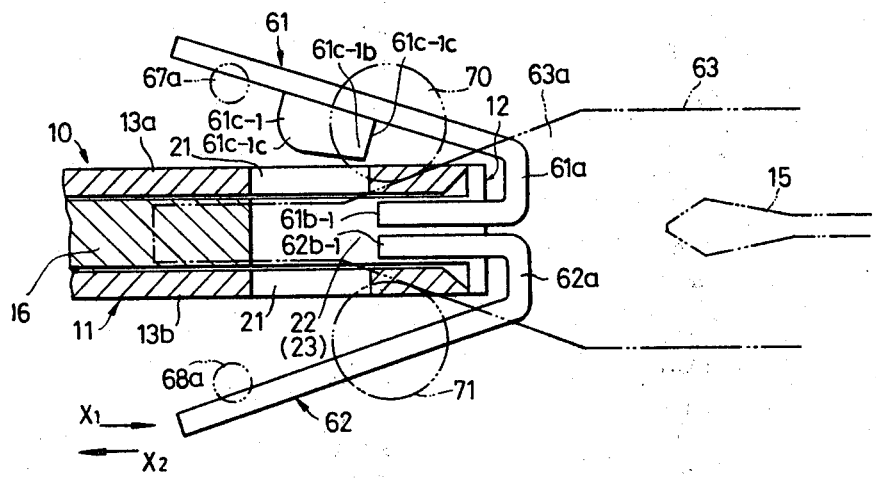

The disc case 10 is inserted at the height position indicated in FIG. 4A in the arrow direction X1 into the reproducing apparatus 30. When the disc case 10 is thus inserted, it enters into the innermost part of the enlarging device 31, and the case 10 and the enlarging device 31 assume the state indicated in FIG. 4B. More specifically, the enlarging fingers 61b-1, 62b-1 (61b-2, 62b-2) enter into the cutouts 23 of the lid plate 12 and advance relatively into the opening part 23 of the jacket 11. The windows 21 of the jacket 11 are then positioned immediately below the lugs 61c-1 and 61c-2. As a consequence of the succeeding insertion of the case, the enlarging device 31 is pushed and moves in the arrow direction X1.

Figure 4C:
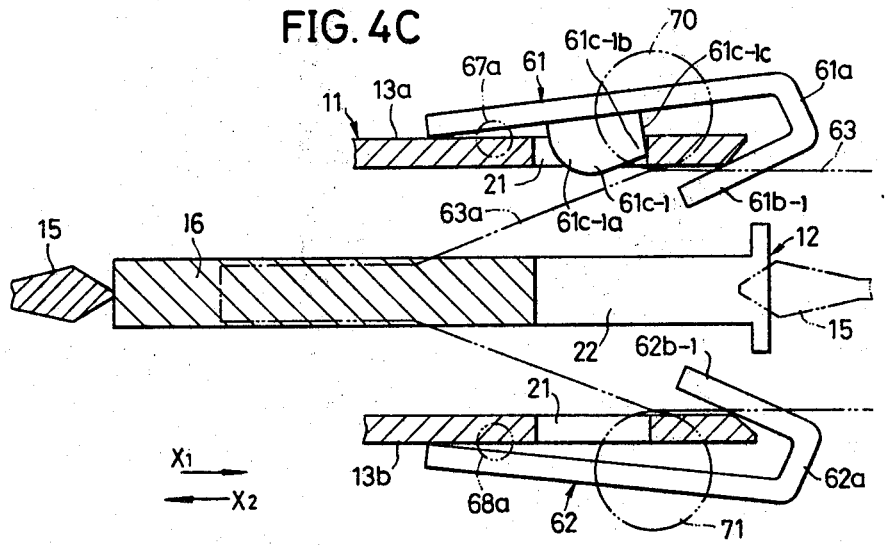

This movement of the enlarging device 31 causes the rollers 70 and 71 ro roll up the tapered part 63a, as indicated in FIG. 4C and the upper and lower enlarging members 61 and 62 to rotate in the arrow directions A2 and B2 counter to the force of the springs 69a and 69b so that the free or distal ends of the enlarging members separate. Consequently, the enlarging fingers 61b-1 (61b-2) and 62b-1 (62b-2) are displaced in mutually separating upward and downward directions. At this time, the enlarging finger 61b-1 (61b-2) engages the upper jacket half 13a and pulls it upward, while the enlarging finger 62b-1 (62b-2) engages the lower jacket half 13b and pulls it downward. The jacket opening part 23 is thus enlarged upward and downward.

The disc case 10 is thereafter inserted in this opening enlarged state in the arrow direction X1. Futther, only the jacket 11 is drawn out in the arrow direction X2.

When the jacket 11 assumes the opening enlarged state, the windows 21 of the upper jacket half 13a fit onto the lugs 61c-1 and 61c-2 of the upper enlarging member 61. As a result, at the time of drawing out of the case 10, the enlarging device 31 is drawn back together with the jacket 11 in the arrow direction X2 with the edges of the windows 21 in engaged state with the lugs 61c-1 and 61c-2.

When the enlarging device 31 is drawn back to the vicinity of the inserting opening 51, the rollers 70 and 71 are on the tapered part 63a of the guide rail 63, and the upper and lower enlarging members 61 and 62 respectively rotate in the arrow directions A1 and B1. Consequently, the enlarging device 31 assumes the state indicated in FIG. 4A. As a consequence, the opening part of the jacket 11 becomes closed, and the edges of the windows 21 disengage from the lugs 61c-1 and 61c-2. Thus, the jacket 11 and the enlarging device 31 become disconnected, and the jacket 11 is drawn out of the reproducing apparatus 30.

Here, the lug 61c-1 (61c-2) is formed to have an arcuate part 61c-1a on its side nearest the inserting opening 51. By this feature, the insertion of the disc case 10 into the enlarging device 31 is not obstructed and is carried out smoothly. Moreover, when a person is cleaning the inner side of the inserting opening 51, his finger will not be injured even if it should strike this lug part $61_{1c\text{-}1a}$. Furthermore, the lug 61c-1 (61c-2) is provided with an angular part 61c-1b at its inner portion. By this provision, the edge of the window 21 and the lug 61c-1 assume a mutually engaged state wherein they are not easily disengaged as indicated in FIG. 4C, and, when the jacket 11 is drawn out, the enlarging device 31, together with the jacket 11, is positively drawn back in the arrow direction X2. A further feature is that this angular part 61c-1b has an inner linear edge 61c-1c which, when the jacket opening part 23 is enlarged, is in an inclined state as indicated in FIG. 4B, and the edge of each window 21 engages smoothly with the lug 61c-1.

Furthermore, the lug 61c-1 (61c-2) is formed on only the upper enlarging member 61. Therefore, it cannot be easily seen from the outside, which is a convenient feature.

Still another feature of the upper engaging member 61 is that the enlarging finger 61b-1 (61b-2) is provided separately from the lug 61c-1 (61c-2), and the enlarging fingers 61b-1 and 61b-2 need to merely engage the jacket halves 13a and 13b, it being unnecessary for them to fit into the windows 21. This is also a feature of the lower enlarging member 62, in which it is necessary for the enlarging fingers 62b-1 and 62b-2 to merely engage the jacket halves 13a and 13b. For this reason, the projecting length 1 of the enlarging fingers 61b-1. 61b-2, 62b-1, and 62b-2 may be made considerably short. Moreover, these enlarging fingers are formed at positions most remote from the inserting opening 51 in the enlarging members 61 and 62, and their outer tips are in positions which are further inside the disc reproducing apparatus 30 than the lug 61c-1. For this reason, when a person is wiping the front face of the reproducing apparatus 30, there is almost no possibility of his member tips being caught on the enlarging fingers 61b-1, 61b-2, 62b-1, and 62b-2, whereby he can safely carry out his cleaning.

Further, this invention is not limited to these embodiments but various variations and modifications may be made without departing from the scope of the invention.

What is claimed is:

1. An apparatus for reproducing a rotary recording medium accommodated within a case, said case comprising a jacket having a space for accommodating the rotary recording medium therein and an opening through which said medium can enter and leave the jacket and a lid member inserted through said opening of the jacket for covering and closing the opening, said reproducing apparatus comprising:
   a front side having an elongated inserting opening therein through which the case is inserted;
   holding means disposed at a rear part of the reproducing apparatus, for holding the rotary recording medium within the reproducing apparatus responsive to an insertion of the case into the reproducing apparatus and then a withdrawal of the jacket from the reproducing apparatus;
   turntable means positioned between said inserting opening and a rear part of the reproducing opening for rotating the recording medium thus left within the reproducing apparatus; and
   jacket opening enlarging means for coupling with the jacket and being movable over the turntable means between the inserting opening and said rear part of the reproducing apparatus, said enlarging means coordinating with the insertion and extraction of said case having the jacket,
   said jacket opening enlarging means comprising
   upper and lower elongated enlarging members aligned horizontally with said inserting opening when said jacket opening enlarging means is prepared for receiving the inserted case, said upper and lower enlarging members being pivotally coupled to each other with their front edges being mutually open toward said inserting opening and their rear edges being mutually closed;
   finger means projecting toward said inserting opening on the respective front edges of said upper and lower enlarging members, said fingers entering into cutouts in the lid member and mutually separating from each other to enlarge the opening of the jacket as the case is inserted through the inserting opening and into the reproducing apparatus; and
   means for opening said respective rear edges of said upper and lower enlarging members to mutually separate from each other as said jacket opening enlarging means moves towards said rear part of said reproducing apparatus during the insertion of the case.

2. A reproducing apparatus as claimed in claim 1 in which the jacket has windows formed in upper and lower surfaces thereof in the vicinity of said opening of the jacket, and at least one of the upper and lower enlarging members has lugs for engaging and fitting into the windows of the jacket having the enlarged opening, said lugs being provided independently of said fingers.

3. A reproducing apparatus as claimed in claim 2 in which the fingers have a length (l) such that free ends of the fingers do not reach the lugs.

4. A reproducing apparatus as claimed in claim 2 in which the lugs are provided on only the upper enlarging member.

5. A reproducing apparatus as claimed in claim 2 in which each lug is formed with an arcuate part which extends toward the inserting opening.

6. A reproducing apparatus as claimed in claim 2 in which each lug is formed with an angular part which extends away from the inserting opening.

7. A reproducing apparatus as claimed in claim 1 in which the means for opening said respective rear edges comprises a tapered part formed in a guide rail for guiding the enlarging means at an end of the guide rail toward the inserting opening, and rollers on the upper and lower enlarging members for rolling over tapered surfaces of the tapered part.

* * * * *